Feb. 24, 1925.

H. M. SIEMANN

ROPE FASTENER

Filed March 11, 1924

1,527,492

INVENTOR.
H. M. Siemann
BY
ATTORNEY.

Patented Feb. 24, 1925.

1,527,492

UNITED STATES PATENT OFFICE.

HENRY M. SIEMANN, OF FORT LUPTON, COLORADO.

ROPE FASTENER.

Application filed March 11, 1924. Serial No. 698,439.

*To all whom it may concern:*

Be it known that I, HENRY M. SIEMANN, a citizen of the United States, residing at Fort Lupton, in the county of Weld and State of Colorado, have invented certain new and useful Improvements in Rope Fasteners, of which the following is a specification.

My invention relates to rope fasteners and its primary object is to provide in connection with a rope, a simple, practical and highly efficient means for fastening an end thereof upon itself for the main purpose of securing the rope to an object to which it is applied.

A further object of the invention is to provide a fastener which will cause the rope to tighten upon an object encircled thereby, by pulling it lengthwise away from the object and still another object is to provide a fastener which will increase its hold upon the rope in ratio to the stress to which it is subjected when the rope is in use.

My invention is particularly applicable to lines of the kind commonly used for towing motor vehicles and it is adapted for use in connection with ropes made of wire as well as on ropes composed of hemp or other fibers.

In its use in connection with a tow line, the invention is particularly advantageous in that it permits of applying the line without the necessity of crawling under the vehicle for the purpose of securing an end of the rope to the axle or of passing it around the same.

An embodiment of my invention has been illustrated in the accompanying drawings in which like characters of reference designate corresponding parts throughout the views and in which—

Referring more specifically to the drawings, my improved fastener comprises a spiral 5 preferably made of heavy wire, which at one of its ends is provided with an eye 6 for the attachment of the rope 7.

It is a distinctive and essential feature of the invention that the inside diameter of the spiral exceeds that of the rope to which the fastener is applied and that the eye at the end of the fastener is positioned to one side of the passage presented by the interior of the spiral so as not to interfere with the free lengthwise movement of a rope through said passage.

The end of the rope is tied to the eye of the fastener by intertwining its strands so that the diameter of the rope is not materially changed to prevent of its moving freely through the interior passage of the spiral to the very point at which the fastener is attached.

Figure 1:
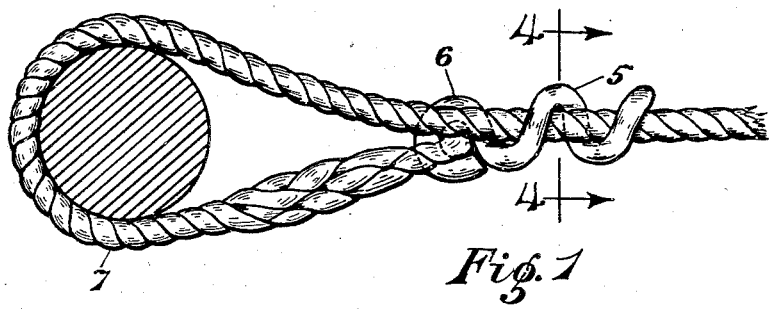
Figure 1 represents the fastener applied to a rope, in the position it occupies in fastening an end of the rope upon itself.

In Figure 1 of the drawings, the rope is shown as fastened upon itself by passing it through the spiral of a fastener attached at an end thereof. The loop thus formed has been shown as applied to an axle 8, and it will be evident that by pulling the body portion of the rope away from the axle, the loop will be tightened upon the same.

Figure 2:
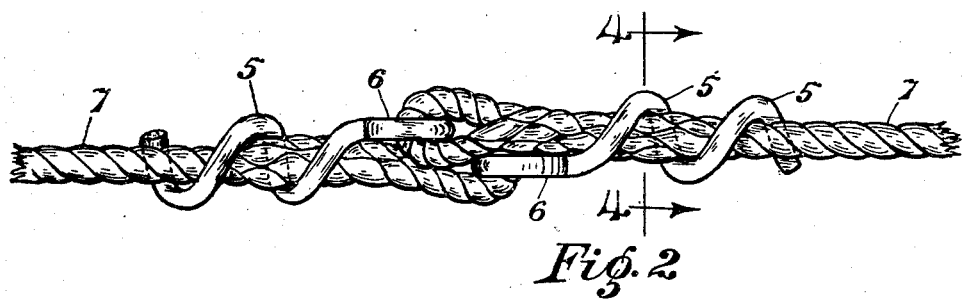
Figure 2 shows a rope provided with fasteners for forming it into an endless loop by securing the ends of the rope together.
Figure 3:
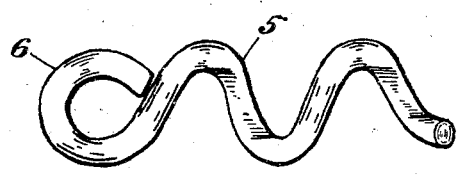
Figure 3 represents a detailed elevation of the fastener.
Figure 4:
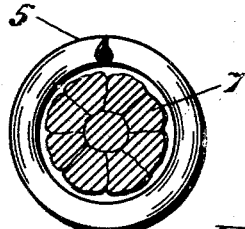
Figure 4 represents an enlarged section taken on the line 4—4, Figures 1 and 2.

In Figure 2, the rope is formed into an endless loop by passing it through the spirals of fasteners applied at opposite ends thereof and by pulling the end-portions of the rope in opposite directions, the fasteners are brought together until their further movement is arrested by engagement of the strands of the rope drawn through the eyes of the fasteners.

I am aware that devices somewhat similar to the present invention have been employed heretofore for fastening a rope or other flexible connection by crimping or otherwise twisting it within a spiral so that it remains immovably in place therein, and I desire it understood that my invention resides solely in the arrangement of the eye to the spiral and in the combination of a spiral with a rope of less diameter than the interior passage thereof, as specified in the hereunto appended claims.

What I claim and desire to secure by Letters Patent is:

1. A rope fastener comprising a spiral providing a straight passage for a rope of lesser diameter, and an eye at an end of the spiral positioned at a side of the passage.

2. The combination with a spiral providing a straight interior passage and terminating in an eye at a side of said passage, of a rope of less diameter than the passage, fastened to said eye.

3. The combination with a spiral providing a straight interior passage and terminating in an eye at a side of said passage, of a rope of less diameter than the passage, fastened to said eye by intertwisted strands.

In testimony whereof I have affixed my signature.

HENRY M. SIEMANN.